July 3, 1951

G. A. DECKER 2,559,039

SIMULATED RADIO DIRECTION FINDING
MEANS FOR AVIATION TRAINERS

Filed April 3, 1945

GEORGE ALTON DECKER
*INVENTOR.*

BY
*Donald T. Hellier*
*Philip S. Hopkins*
ATTORNEYS

GEORGE ALTON DECKER
INVENTOR.

July 3, 1951
G. A. DECKER
2,559,039
SIMULATED RADIO DIRECTION FINDING MEANS FOR AVIATION TRAINERS
Filed April 3, 1945
3 Sheets—Sheet 3
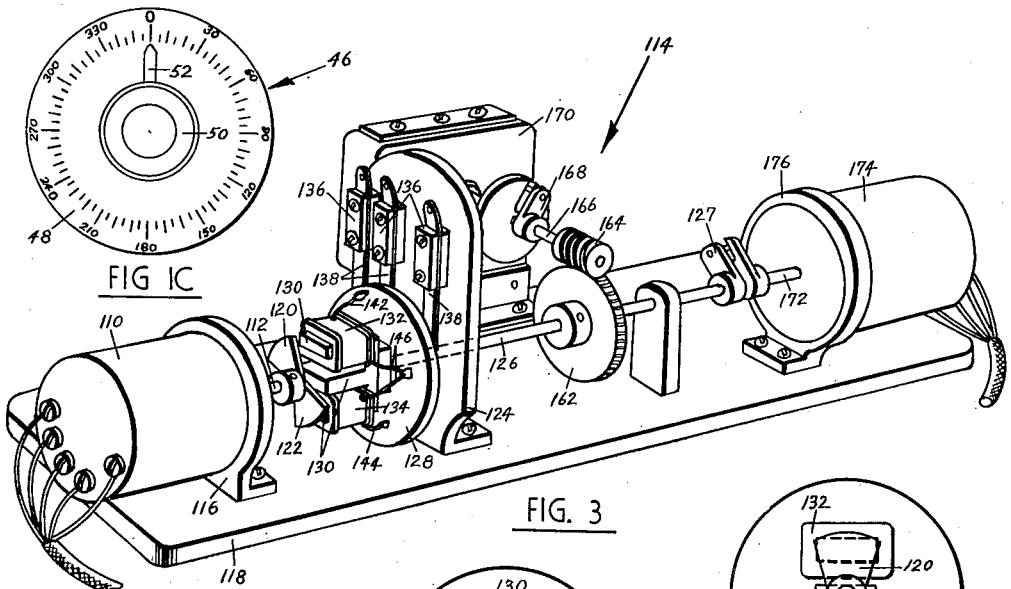
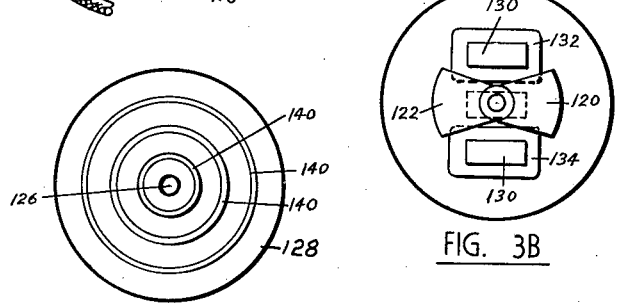
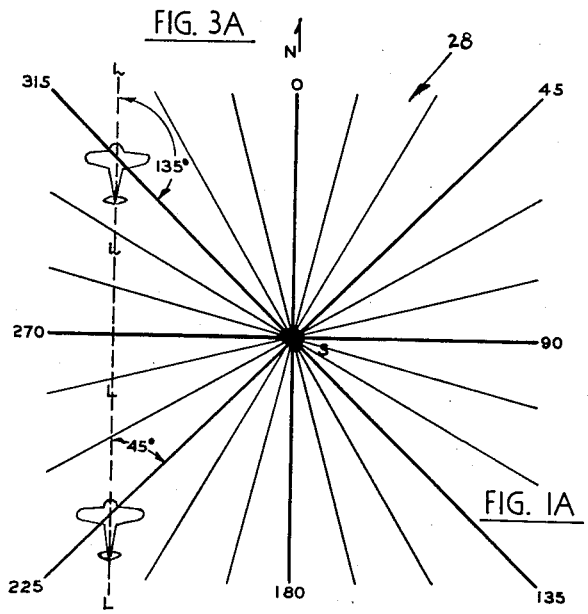
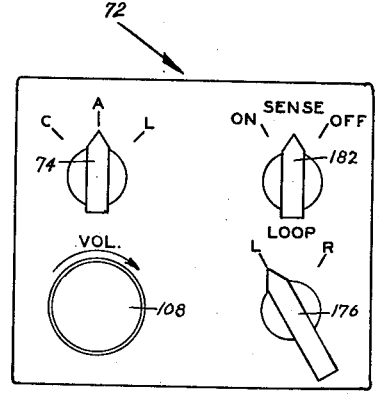
GEORGE ALTON DECKER
*INVENTOR.*
BY Donald T. Heller
Philip J. Hopkins
ATTORNEYS Patented July 3, 1951

2,559,039

UNITED STATES PATENT OFFICE 2,559,039

SIMULATED RADIO DIRECTION FINDING MEANS FOR AVIATION TRAINERS

George Alton Decker, Fenton, N. Y., assignor to Link Aviation Inc., Binghamton, N. Y., a corporation of New York Application April 3, 1945, Serial No. 586,362

3 Claims. (Cl. 35—10.2)

This invention relates to improved means for simulating in grounded aviation trainers the operation of radio compass devices carried by planes in actual flight.

Radio direction finders carried by planes in actual flight may be found in several different forms but all of them may be classified as either visual or aural. Regardless of whether the indicator is of the visual or aural type, it always indicates the bearing of the radio station to which the receiver is tuned relative to the nose of the airplane. Bearing is defined as the angle between the longitudinal axis of the airplane measured clockwise to a line through the plane and radio station.

For example, in Fig. 1A the line L—L represents the longitudinal axis of the aircraft, the airplane silhouette represents the geographical location of the plane and S represents the geographic location of the radio station. The aircraft heading is zero degrees and its bearing from the station (station to plane bearing) is 225 degrees. In this instance the bearing of the radio station relative to the nose of the plane is 45 degrees.

Now let us assume that the airplane does not change its geographical position but does change its heading from zero degrees to 45 degrees. In this instance the bearing of the radio station relative to the nose of the plane would be zero degrees because the station would be dead ahead. On the other hand, if the airplane does not change its geographical position but its heading is changed from zero degrees to 315 degrees, the bearing of the radio station relative to the nose of the plane would be 90 degrees.

In view of the above explanation it will be appreciated that the first factor which determines the bearing of a radio station from a plane in actual flight is the heading of the plane. As the plane changes its heading by a given number of degrees, the bearing of the station changes by an equal number of degrees. When the plane is heading directly toward the station the bearing is zero, and a turning to the left of the plane increases the bearing while a turning to the right has an opposite effect.

Referring again to Fig. 1A, let us assume that the aircraft is positioned on the 225 degree bearing line from the station, the aircraft heading being zero degrees and the plane flies due north until it is located on the 315 degree bearing line from the station. It will be noted that in the course of its travel the bearing of the station from the plane would be constantly changing. In the lowermost position shown in Fig. 1A the bearing is 45 degrees; when the airplane is located upon the 270 degree bearing line from the station, its heading being maintained at zero degrees, the bearing of the station is 90 degrees; and when the aircraft is located as shown in Fig. 1A upon the 315 degree bearing line from this station, the bearing becomes 135 degrees.

In view of the preceding discussion it will be appreciated that the second factor which affects the bearing of a radio station relative to the nose of a plane in actual flight is the bearing from the station to the geographical location of the plane. This is referred to as the station to plane bearing. As this bearing changes by a given number of degrees, the bearing of the station relative to the nose of the plane changes by an equal number of degrees.

The above two factors are the only factors which affect the bearing of a radio station relative to the nose of a plane in actual flight. Having ascertained this bearing the navigator or radio man may use the bearing in several different ways in order to determine the proper course of flight of the aircraft, or the geographical position of the same. For example, if a known course were being flown and the aircraft were making good a definite geographical track, the bearing relative to the nose would determine the position of the aircraft along its flight path relative to the known position of the radio station. Another instance, when the bearing of the radio station relative to the nose of the plane is zero degrees, the plane is flying directly toward the station and by maintaining such a bearing the plane will pass directly over the station.

As stated above, the means used in actual aircraft for indicating to the pilot, radioman or navigator the bearing of a radio station relative to the nose of the plane may be either visual or aural. The visual type instruments include the well-known left-right indicator, neon light, and the automatic radio compass while the aural indicator takes the form of earphones. All types of indicators are responsive to the above two described factors which affect the bearing of the radio station from the plane.

It may be here stated that in a given lane more than one type of radio direction indicator is usually connected to the same receiving set so that the operator may under different circumstances select the type of indicator which he desires to employ. The most widely used installation employs selectively the automatic radio compass as well as the earphones to give an aural direction-responsive signal. Also, such installations have the conventional non-directional antennae reception which may be used at the same time that the automatic radio compass visually indicates the bearing of the station. In installations of this type a control chassis is found in the plane, and a suitable switching arrangement is provided so that the operator may select the automatic radio compass indicator in conjunction with the non-directional aural antenna reception, the antenna reception alone, or the aural direction finding features of the equipment.

The principal object of this invention is to provide in a grounded navigation training system novel apparatus for simulating the functioning of the just described radio installations carried by planes in actual flight.

All radio compasses utilize as a fundamental principle the fact that a loop antenna is highly directional and when the source of energy (radio transmitting station) bears certain angular relations to the plane of the antenna, the ratio of response (volume) of the received energy will be evident to the observer through suitable indicating instruments. When the plane of the loop antenna is in line with the radio transmitting station, maximum energy is induced therein while minimum response is achieved when the axis of the loop is in line with the station.

Inasmuch as the loop antenna has a maximum response when the plane of the loop is in line with the radio transmitting station and minimum response when the axis of the loop is in line with the station, it will be appreciated that when the loop is rotated through 360 degrees, there will be two positions of maximum and two positions of minimum response. When the loop antenna is connected to an automatic radio compass indicator, which comprises a dial graduated from zero through 360 degrees with a pointer mounted for movement over the dial, the intermediate system comprises a "sensing" arrangement so that the automatic radio compass indicator does not give an ambiguous indication, i. e., the position of the needle relative to the dial always indicates the bearing of the station to which the radio receiver is tuned. However, when the loop antenna is connected to the earphones to give an aural signal, unless a "sensing" arrangement is incorporated in the system, for each complete rotation of the loop antenna there will be two positions 180 degrees apart at which the signal reaches a maximum intensity as well as two positions 180 degrees apart at which no signal will be heard. The no-signal position is commonly referred to as the "null" position. However aircraft receivers employing the aural indicating method oftentimes are provided with a switch under the control of the operator which may be used by him in a manner more fully described hereinafter to resolve the 180 degree ambiguity. In the use of the aural method, the loop is rotated by the operator until the "null" position is reached. The loop is connected to a suitable indicator which indicates at all times the angular position of the plane of the loop with respect to the longitudinal axis of the aircraft. When the "null" position is reached the indicator gives the bearing to the station or the reciprocal thereof.

This invention aims to provide means whereby all of the above functioning of real radio equipment carried by planes in actual flight is faithfully simulated in a grounded navigation training system.

Further, another object of my invention is to provide improved means whereby the visual and aural indicators indicate to the student an assumed bearing relative to the nose of a plane of the radio station, this assumed bearing depending upon the assumed heading of the plane as well as the assumed bearing from the station to the location of the plane.

It is also an object of this invention to provide in a grounded navigation training system means whereby the simulated aural radio direction finding means may be operated by a student in the same manner that he would operate the corresponding real apparatus in real aircraft.

In order that the preferred embodiment of my invention may be clearly understood, reference is made to the accompanying drawings in which like numbers designate like parts. In the drawings, Fig. 1 is a general view showing an aviation trainer together with the desk and recorder of the type such as are generally used in conjunction with such trainers. This figure also shows the general location of the major parts of this invention.

Fig. 3 is a mechanical drawing of a part of the simulated loop-drive assembly of this invention.

Fig. 3A is a detail showing of a part of the apparatus in Fig. 3.

Figs. 3B and 3C illustrate the operation of the loop drive assembly.

Figure 1:
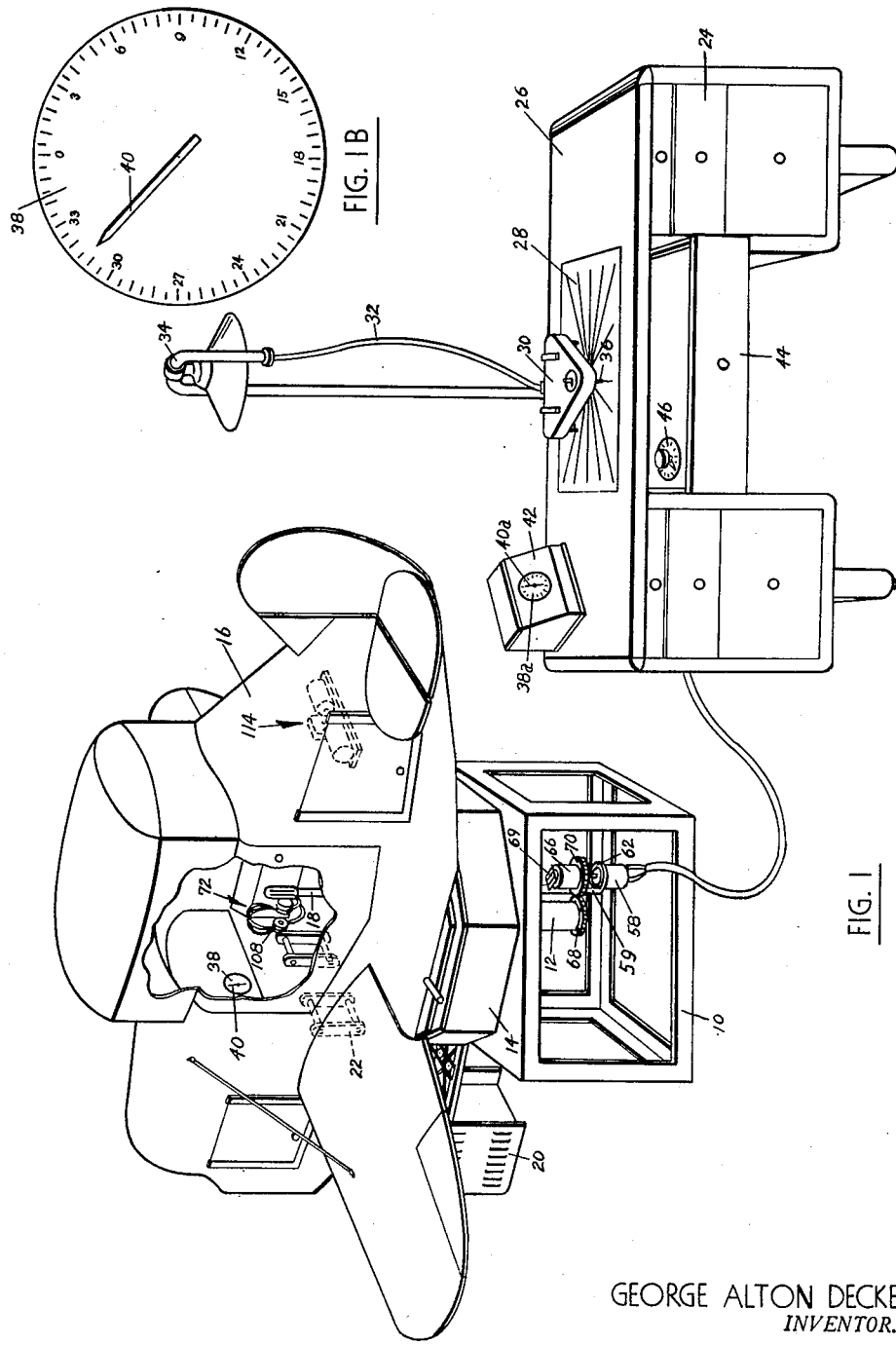
Fig. 1A is a detailed view of a chart such as may be used in conjunction with this invention.
Fig. 1B is a detailed view of an automatic radio compass indicator.
Fig. 1C is a detailed view of the instructor's control knob for setting in the factor of assumed station to plane bearing.
Fig. 1D is a detailed view of the student's radio control box.

My invention will be explained when used in conjunction with aviation trainers of the type manufactured by Link Aviation, Inc., of Binghamton, New York. Referring to Fig. 1, the trainer comprises a stationary base 10 rotatably holding a main vertical spindle 12 to which is fixedly connected the conventional octagon 14. Above the octagon 14 is the fuselage 16 which, as is well known in the art, is universally mounted upon the upper end of the vertical spindle 12 so that the fuselage may pitch and bank about axes through the universal joint in simulation of the pitching and banking of an airplane in actual flight. This pitching and banking is accomplished by the student who sits in the fuselage 16 in a seat positioned behind the control stick 18. By selectively moving the control stick 18, the student may cause the fuselage 16 to assume the desired pitching and banking position.

The conventional turning motor 20 is shown and by means of the rudder pedals 22 within the fuselage 16, the students may energize the turning motor 20 to cause the octagon 14, spindle 12 and fuselage 16 to rotate about a vertical axis in the desired direction through any number of degrees.

The detailed construction and operation of trainers of the type shown in Fig. 1 are well known to the prior art and for a more detailed explanation thereof reference is made to U. S. Patent 2,099,857. Such trainers being known to the prior art, they do not form any part of this invention per se, the invention of this application lying in the provision of novel apparatus which may be used in conjunction with such trainers.

Still referring to Fig. 1, it will be seen that there is provided a desk 24 having a horizontal top 26 upon which may be mounted a chart 28. A typical chart 28 is shown in detail in Fig. 1A and it will be seen in that figure that near the center thereof is a point designated S, which represents the geographic location of a radio transmitting station. A plurality of radial straight lines 15 degrees apart pass through the point S to represent the major bearing lines through the location of the station.

Upon the chart 28 is placed the conventional recorder 30 which is connected through the electrical cable 32 passing through the gooseneck 34 with the fuselage 16 in a manner such as is well known to the prior art. This recorder 30 travels over the chart 28 at a rate at all times proportional to the assumed ground speed of the fuselage 16 and the recorder 30 is directionally controlled by the fuselage 16 so that it moves across the chart 28 in a direction at all times in accordance with the assumed instant heading of the fuselage 16. An inking wheel 36 is a part of the recorder 30 and it is the exact position of this inking wheel upon the chart 28 which at all times indicates the exact assumed geographical position of the fuselage 16 with respect to the location of the radio station. It will be appreciated, therefore, that the instructor can ascertain the assumed bearing of the airplane represented by the fuselage 16 from the assumed location of the transmitting radio station by referring to the position of the inking wheel 36 upon the chart 28. This bearing, as explained above, is the assumed station to plane bearing.

For a more detailed explanation of the construction and operation of the recorder 30, reference is made to U. S. Patent 2,179,663.

Still referring to Fig. 1, it will be seen that inside the fuselage 16 is a radio compass indicator 38 positioned upon the conventional instrument panel. This indicator is shown in detail in Fig. 1B and it will be seen that the dial 38 is graduated clockwise from zero through 360 degrees and that a pointer 40 is mounted at the center of the dial for movement thereover. Mounted upon the top 26 of the desk 24 is the chassis 42 carrying a second dial 38a which corresponds to the dial 38 and a second needle 40a arranged to move over its associated dial. The radio compass indicator 38 inside fuselage 16 indicates to the student in the fuselage the assumed bearing of the radio station from the plane represented by the fuselage 16 while the instrument 38a indicates to the instructor who is located in front of the desk 24 the same assumed bearing.

Still referring to Fig. 1, it will be seen that the desk 24 comprises a drawer 44 in which is mounted a unit 46 shown in detail in Fig. 1C. In Fig. 1C it will be seen that this unit comprises a dial 48 graduated from zero through 360 and a knob 50 connected to a pointer 52 is mounted in the center of this dial. A suitable vernier drive may be interposed between the knob 50 and pointer 52. As will become clear as the description proceeds, the apparatus shown in Fig. 1C is used by the instructor to introduce the factor of assumed station to plane bearing.

Figure 2:
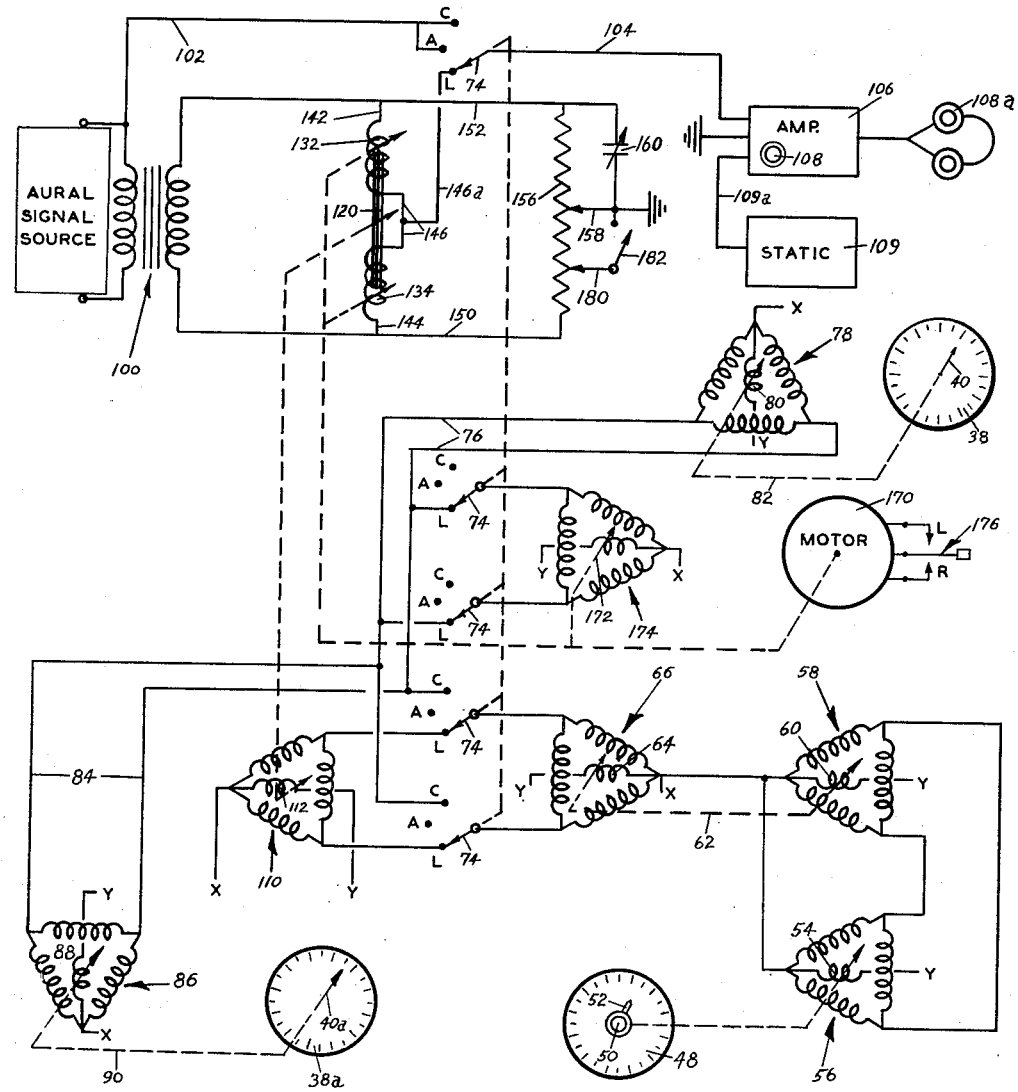
Fig. 2 is a detailed view of the electrical wiring system of this invention.

Reference is now made to Fig. 2 which is a detailed drawing of the electrical parts of this invention. In Fig. 2 the dial 48 is shown and it will be seen that the knob 50 and pointer 52 are connected to the rotor 54 of the assumed station to plane bearing Selsyn motor transmitter designated generally 56. The stator coils of transmitter 56 are connected as shown to the stator coils of the assumed station to plane Selsyn receiver designated generally by 58. Transmitter 56 is located in the drawer 44 and the location of receiver 58 is shown in Fig. 1. It will be seen that the housing of this receiver is fixedly held by the bracket 59 suitably mounted in the base 10 of the trainer. Those skilled in the art will appreciate that the rotor 60 of the receiver 58 is always positioned relative to the three stator windings of this receiver in accordance with the position of the rotor 54 relative to the three stator windings of the transmitter 56. Consequently, a rotation of the rotor 54 of the transmitter 56 through a given number of degrees always results in a rotation of the rotor 60 through the same number of degrees and in the desired direction. A reversal in the direction of the rotation of rotor 54 results in a reversal in the direction of movement of the rotor 60. It may therefore be concluded that the rotor 60 is always positioned in accordance with the instant assumed station to plane bearing, as shown by the position of the inking wheel 36 upon the chart 28, provided of course that the instructor has properly positioned the knob 50 and pointer 52. In explanation, the rotors of the Selsyn transmitters and receivers are supplied across the terminals $x$—$y$ with 32 volts 60 cycle alternating current.

In Fig. 2 it will be seen that the rotor 60 of the receiver 58 is connected by means of the mechanical connection 62 to the rotor 64 of the Selsyn transmitter designated generally by 66. Inasmuch as the rotor 64 is so connected to the rotor 60 it will be appreciated that the rotor 64 always occupies an angular position about its own axis in accordance with the instant assumed station to plane bearing.

The position of the transmitter 66 is shown in Fig. 1 to be in the base 10 of the trainer. The mechanical linkage 62 between the rotor of the receiver 58 and transmitter 66 is also shown in Fig. 1. Upon the lower end of the vertical spindle 12 is affixed a gear 68 which makes one complete rotation for each rotation of the fuselage 16. Gear 68 drives gear 70 which has a 1:1 ratio therewith, gear 70 being affixed upon the housing of the Selsyn transmitter 66. The housing of transmitter 66 rotates once for each rotation of the fuselage 16, and therefore it will be appreciated that the stator coils of transmitter 66 are always positioned according to the instant assumed heading of the plane represented by the fuselage 16. The brush and slip ring assembly 69 in Fig. 1 may be employed to make electrical connection with Selsyn 66.

Inasmuch as the rotor 64 of the transmitter 66 is always angularly positioned in accordance with the instant assumed station to plane bearing, and inasmuch as the field windings of the transmitter 66 are always positioned in accordance with the position of the fuselage 16 about its vertical axis, which position represents the instant assumed heading of the plane represented by the fuselage 16, it will be appreciated that the relative position of the field windings of the transmitter 66 relative to the rotor 64 is at all times in accordance with the instant assumed bearing of a radio station relative to the plane in actual flight represented by the fuselage 16. This will be appreciated in view of the above explanation that the two factors of airplane heading and station to plane bearing are the only factors which affect the bearing of a radio station from a plane in actual flight.

Referring now to Fig. 1, it will be seen that inside the fuselage 16 is the student's radio control box 72, a detailed view of which is shown in Fig. 1D. In Fig. 1D it will be seen that this radio control box comprises a selector switch 74 which may be positioned in any one of three positions. The letter "C" designates the "comprehensive" position; the letter "A" represents the "antenna" position; and the letter "L" represents the "loop" position. Referring now to Fig. 2, it will be appreciated that when the selector switch 74, which in reality is a five-bank gang switch, is positioned in the "C" position, the transmitter 66 is connected through the conductors 76 and the conventional main slip rings in the trainer with the field windings of the Selsyn receiver designated generally 78. Those skilled in the art will appreciate that when switch 74 is in the "C" position, the rotor 80 of the receiver 78 is always positioned relative to the field windings of this receiver in accordance with the relative positions of the rotor 64 and field windings of the transmitter 66. The rotor 80 is therefore always positioned relative to its field windings in accordance with the instant assumed bearing of the radio station from the fuselage 16. The mechanical connection 82 connects the rotor 80 with the needle 40 of the student's simulated radio compass indicator and therefore the needle 40 and dial 38 always indicate to the student in the trainer the instant assumed bearing of the radio station when switch 74 is in the "C" position.

Still referring to Fig. 2, when the student positions the switch 74 in the "C" position, it will be seen that the field windings of the Selsyn receiver 86 are connected to the field windings of transmitter 66. Rotor 88 of the receiver 86 at all times assumes the same angular position relative to the field windings of the receiver 86 as the rotor 64 bears relative to the field windings of the transmitter 66. As previously explained rotor 64 is positioned relative to the field winding of transmitter 66 in accordance with the instant assumed station bearing.

The mechanical coupling 90 connects the needle 40a with the rotor 88 so that the needle 40a is positioned with respect to the fixed dial 38a to indicate to the instructor the instant assumed station bearing. The location of the dial 38a and needle 40a is shown in Fig. 1. The indications of these two indicators automatically change with a change in the assumed heading of the plane represented by the fuselage 16, and change when the instructor introduces a different assumed station to plane bearing in response to movements of the recorder 30 over the chart 28.

It will therefore be appreciated that this invention discloses in a grounded navigation training system, means whereby the instant assumed bearing of a radio station relative to a plane in actual flight may be indicated to the student as well as to the instructor. This is accomplished by differentially combining the assumed station to plane bearing with the assumed heading of the plane, which two factors determine the assumed bearing of a radio station from a plane in actual flight. It should be noted that there is no ambiguity in the indicated bearing and that the bearing is automatically given even when the switch is placed in the "C" or comprehensive position. This simulates the operation of the real apparatus carried by a plane in actual flight.

In a plane in actual flight equipped with an automatic radio compass indicator which indicates the bearing of a radio station from a plane in actual flight when the selector switch is placed in the "comprehensive" position, means are also provided whereby the pilot, navigator or radio man, as the case may be, will, in addition to having visually indicated to him the bearing of the station to which the receiver is tuned, also hear through the earphones associated with the radio equipment the signals transmitted by the radio station. The radio station may, of course, be a radio range station maintained under the control of the Civil Aeronautics Administration or it may be a standard commercial broadcast station or any other type of radio transmitter. The following means are provided by this invention in order that the student in the fuselage 16 may hear signals simulating those transmitted by the radio station as well as see the previously described visual indication of the bearing of the station from the plane when the selector switch is in the "C" position.

Referring to Fig. 2, there is shown in block form an aural signal source connected across the primary of the transformer 100. This aural signal input source may be the conventional source of simulated radio range signals such as is widely employed in the field of grounded aviation instruction or it may provide any other suitable audible signal. It will be appreciated that when the selector switch is in the "C" position, the signals pass along the conductor 102 to the "C" terminal of the selector switch 74, seen in Fig. 2. The signals pass from the "C" terminal along the conductor 104 to the amplifier 106 provided with the volume control 108 which, as seen in Fig. 1D, is a portion of the student's radio control box. The signals are emitted by means of the student's earphones 108a at an intensity dependent upon the setting of the volume control 108. The detailed construction of the amplifier 106 is not shown because an amplifier of suitable type may be properly constructed by any person skilled in the art to which this invention relates.

Consequently the student in the trainer may by positioning the selector switch 74 in the "C" position automatically have at his disposal a visual indication of the correct assumed bearing of the radio station from the plane represented by the trainer 16, and by means of the earphones he may hear the A-N signals, which, as will be understood by those skilled in the art, are transmitted by the instructor according to the position of the recorder 30 upon the chart 28.

A duplicate set of earphones connected to the amplifier 106 may be provided for the instructor, as is well known in the prior art, and also, a suitable source of static 109 may be connected to the amplifier through conductor 109a.

In actual aircraft equipped with radio receiving equipment of the type being considered, when the operator in the plane positions the selector switch of the radio receiving equipment in the "antenna" or "A" position, the automatic radio compass does not give an indication of the bearing of the radio station relative to the plane. Only the modulating signals transmitted by the radio station to which the receiver is tuned are heard by the person using the earphones. In the event the receiver is tuned to a radio range station, the signals will, of course, depend upon the position of the plane relative to the quadrants of the station, and in any event the volume of the signals will depend upon the distance of the plane from the station.

The antenna or "A" position is shown in Fig. 1D, and by referring to Fig. 2 it will be appreciated that when the student places the selector switch 74 in the "A" position, the signals from the aural signal source pass along the conductor 102 to the "A" terminal and then by means of the conductor 104 to the amplifier 106. The student hears the signals by means of earphones 108a. It will be noticed that when the selector switch 74 is in this position, the Selsyn transmitter 66 is not connected to the receiving teletorques 78 and 86 and therefore the simulated automatic radio compasses 38 and 38a do not indicate the assumed bearing of the radio station.

In addition to the "comprehensive" and "antenna" positions, actual aircraft radio receiving apparatus of the type being simulated generally have a third position which is known as the "loop" position. This position is often designated as the "L" position. When the selector switch in actual aircraft radio receiving apparatus is placed in the "L" position, the automatic radio compass does not automatically indicate to the pilot, navigator or radio man the bearing of the radio station relative to the plane. In the "L" position it is necessary for the operator to use the earphones associated with the radio receiving apparatus and by manual means or by means of a loop-drive motor under his control he must rotate the loop until the loop is in the no-signal or "null" position. As previously explained, this position is realized when no signal is heard in the earphones. Also as previously explained, when the no-signal position is reached, the radio station is known to be located along a line perpendicular to the plane of the loop, but inasmuch as there are two such perpendicular lines it is clear that there will be a 180 degree ambiguity insofar as the known direction of the radio station is concerned. In actual aircraft the loop is connected to the automatic radio compass indicator so that the operator may by visual reference to the indicator ascertain one of the two possible bearings of the station from the plane when the "null" position is reached. (In explanation it may be here stated that in actual flight the 180 degree ambiguity may be resolved by maneuvering the plane in certain well understood manners or by taking a bearing upon a second radio station.)

The following means are incorporated in this invention in order that the operation of aircraft radio receiving apparatus with the selector switch in the "loop" position may be simulated.

Referring now to Fig. 2, it will be recalled that the rotor 64 is always angularly positioned with respect to the stator coils of the transmitter 66 in accordance with the instant assumed bearing of the station from the plane represented by fuselage 16. When the selector switch 74 is in the "L" position, it will be seen that the stator coils of the Selsyn receiver designated generally by 110 are connected to the stator coils of transmitter 66. Accordingly, the rotor 112 of the receiver 110 is always positioned relative to the stator coils of the receiver according to the instant assumed station bearing. Reference is now made to Fig. 3 which is a detailed disclosure of the mechanical arrangement of the loop-drive assembly which forms a part of this invention. The location of this assembly in the fuselage 16 may be seen by reference to Fig. 1.

In Fig. 3 it will be seen that the Selsyn receiver 110 is fixedly mounted in the bracket 116 which in turn is affixed to the base plate 118. This base plate is affixed to a suitable part of the interior of the fuselage 16. The rotor 112 of the receiver 110 is shown in Fig. 3 and it will be seen that affixed upon the outer end of this rotor is an iron vane 120. A counter-balancing vane 122 made of a metal having non-magnetic properties, such as brass, is also affixed upon the rotor 112. It will be appreciated that the vane 120 is always positioned in rotation according to the instant assumed bearing of the radio station from the plane represented by fuselage 16.

In Fig. 3 it will be seen that a vertical bracket 124 is affixed upon the base plate 118 and rotatably mounted in this bracket is the horizontal shaft 126. Upon the left end of shaft 126 is affixed the collector ring plate 128 upon which in turn is affixed an E-shaped iron core 130. A coil 132 is wound around the upper extension of the E-shaped core 130 and a second coil 134 is wound around the lowermost extension of the E-shaped core. Carried by the insulating blocks 136 which are affixed to the vertical bracket 124 are the three collector brushes 138, each of which constantly bears against one of the collector rings 140 seen in Fig. 3A. These collector rings are affixed to the right side of the plate 128 as seen in Fig. 3. Connected to the outer collector ring 140 is the conductor 142 which is connected to one end of the upper coil 132. Connected to the middle collector ring 140 is the conductor 144 which is connected to one end of the lower coil 134. The other end of each of the coils 132 and 134 is connected by the conductors 146 to the inner collector ring 140.

Reference is now made to Fig. 2 which is a detailed electrical diagram of the coils 132, 134 and associated conductors. In Fig. 2 it will be seen that the coils 132, 134, and the resistor 156 in conjunction with the conductors 146, 146a, 104, 150, 152 and adjustable tap 158 form a Wheatstone bridge arrangement. The tap 158 is, in installation, positioned along the resistor 156 to balance the bridge and the variable condenser 160 may be used to assist in this function. By virtue of this arrangement it will be appreciated that when the inductance of coil 132 is equal to the inductance of coil 134 and when the tap 158 and condenser 160 are properly positioned to balance the bridge, no signal will be heard in the earphones 108a. Assuming the coils to be of inherent equal inductance, referring to Fig. 3B, in the presence of vane 120 the inductance of coil 132 is equal to the inductance of coil 134 only when the vane 120 is positioned relative to the coils 132 and 134 as shown in Fig. 3B, or 180 degrees from the shown position. It will be appreciated that any other position of the vane 120 will unbalance the inductances of the two coils 132 and 134 and that a signal will be heard in the earphones 108a, the magnitude of the signal depending upon the extent of the difference in inductance of these two coils. A maximum signal will be heard in the earphones 108a when the vane 120 is positioned as shown in Fig. 3C or 180 degrees from that position. Assuming that the vane 120 is positioned relative to the coils 132 and 134 as shown in Fig. 3B, no signal will be heard in the earphones 108a. As the vane 120 moves clockwise a signal will begin to be heard in the earphones and this signal will increase in intensity until the vane 120 is 90 degrees from position shown in Fig. 3B. At this point the signal heard in the earphones is at a maximum. As vane 120 continues its movement, the intensity of the signal decreases and when the vane reaches a position 180 degrees from that shown in Fig. 3B, no signal will be heard. As the vane is further rotated, the signal reappears and increases to a maximum when the vane is positioned as shown in Fig. 3C. Further rotation of the vane results in a decrease in signal intensity until when the vane reaches the original position shown in Fig. 3B, again no signal is heard in the earphones. It will therefore be appreciated that for each complete revolution of the vane 120 there are two points 180 degrees apart at which no signal will be heard, and there are two other points, 90 degrees each from the first mentioned point and 180 degrees apart at which a maximum signal will be heard. Thus for each revolution there are two maximum and two minimum signal intensity points. Inasmuch as it is the position of the vane 120 relative to the coils 132 and 134 which determine the intensity of the signals heard in the earphones 108a, a rotation of the coils 132 and 134 with respect to the vane 120 will produce corresponding results.

Referring again to Fig. 3, it will be seen that there is affixed upon the horizontal shaft 126 the worm gear 162 driven by the worm 164 affixed upon the horizontal shaft 166 driven through the coupling 168 by the reversible drive motor 170. Also coupled to the shaft 126 by coupling 127 is the rotor 172 of the Selsyn transmitter 174 which is fixedly held by the bracket 176 attached to the base plate 118. In Fig. 2 it will be seen that the rotor 172 of transmitter 174 is driven by the reversible drive motor 170 and that the stator windings of the transmitter 174 are connected to the stator windings of the receivers 78 and 86 when the selector switch 74 is placed in the "L" position. Therefore a rotation of the drive motor 170 changes the visual indication given to the student and the instructor by means of the simulated compass indicators 38 and 38a. In Fig. 2 it will also be seen that a left-right switch designated generally 176 is provided. This switch is mounted upon the student's radio control box 72 as shown in Fig. 1D. When the switch is placed in the "L" position, the drive motor 170 turns in one direction and a placing of the switch 176 in the "R" position results in a reversing of the drive motor.

Referring to Fig. 2 it will be appreciated that whenever the student in the fuselage 16 places the selector switch 74 in the "L" position, the rotor 112 of the transmitter 110 is positioned relative to the stator windings of transmitter 110 in accordance with the position of the rotor 64 relative to the stator windings of the transmitter 66. As has been mentioned, this position is at all times in accordance with the instant assumed bearing of the radio station from the plane represented by the fuselage 16. Consequently the vane 120 will be positioned in rotation in accordance with the instant assumed radio station bearing. Any rotation of the fuselage 16 or movement of the station-to-plane bearing knob 50 and needle 52 will properly change the angular position of the vane 120. As soon as the selector switch 74 is placed in the "L" position, the position of the rotor 172 of the transmitter 174 determines the position of the needles 40 and 40a relative to the dials 38 and 38a. However this reading will be of significance only in the event that no signal is heard in the earphones 108a. If no signal is heard in the earphones the student will realize that the needle 40 and dial 38 indicate to him the correct assumed bearing of the radio station or that the correct assumed bearing is 180 degrees from that indicated.

Assuming that the student hears a signal in the earphones 108a, he will realize that the indicated bearing is of no significance and he will therefore position the L-R switch 176 in, for example, the "L" position. Upon so doing the drive motor 170 becomes energized and by means of the shaft 166, worm 164, gear 162 and shaft 126 the coils 132 and 134 are rotated relative to the iron vane 120. This rotation will, as explained, result in a change in the intensity of the signals heard in the earphones 108a and the student will continue the rotation until the "null" position is reached. At the same time that the coils 132 and 134 are rotated, it will be appreciated that the input shaft 172 of the transmitter 174 is rotated by an equal amount and by reference to Fig. 2 it will be seen that the pointers 40 and 40a will move over their associated dials 38 and 38a degree for degree of rotation of the coils 132 and 134. When the student has rotated the coils into the no signal position, he will refer to his indicator 38, 40 and he will know that the assumed bearing of the station is that indicated or 180 degrees therefrom.

By maneuvering the trainer as he would a plane in actual flight the student may ascertain whether the indicated bearing is the true bearing or the reciprocal thereof.

The student may of course place the switch 176 in the "R" position to rotate the motor 170, in which case the "null" position will be realized when the coils 132 and 134 are positioned 180 degrees from the "null" position when the motor was energized in the opposite direction. The same ambiguity of course results.

It will be noted that the indication given by the visual indicators when the "null" position is reached depends upon the two basic factors which determine the bearing of a radio station from a plane in actual flight.

Again in actual aircraft radio receiving apparatus there is oftentimes provided a "sense" switch which may be used by the operator in the following manner to remove the 180 degree ambiguity. First with the "sense" switch in the "off" position and with his selector switch in the loop or "L" position, by means of the left-right drive the loop is rotated until the "null" position is reached. The operator then notes the indication given by the indicating instrument and then by watching the indicator rotates the loop antenna to the right 90 degrees from the "null" position (in some installations the loop is rotated 90 degrees left from the null position). With the loop positioned 90 degrees clockwise from the "null" position, the operator mentally notes the intensity of the signals and then throws the "sensing" switch into the "on" position. The apparatus is constructed such that if upon throwing the "sensing" switch to the "on" position the signal intensity substantially decreases, the original bearing was the real bearing. If on the other hand the throwing of the "sensing" switch results in an increase in the signal intensity, the original bearing was the reciprocal of the true bearing.

In order to simulate the functioning of the "sensing" switch forming a part of real aircraft radio receiving apparatus, the following means are incorporated in this invention. Referring to Fig. 2 it will be seen that the tap 180 of the main resistor 156 is connected through the switch 182 to the adjustable tap 158. As will be seen in Fig. 1D, switch 182 is the simulated "sensing" switch. In the "off" position switch 182 is open and it has no effect upon the functioning of the apparatus as explained in detail above. However, when switch 182 is closed it will be appreciated that the bridge is no longer balanced since the switch shorts out a portion of one of the resistance arms. Assuming that the student has positioned the vane 120 so that a "null" position is realized, if he notes the reading of his indicator 38, 40 and then energizes the drive motor 170 by placing the switch 176 in the "R" position until the indication given by the indicator 38, 40 is 90 degrees clockwise from the "null" indication, it will be appreciated that the vane 120 will then increase the inductance of one of the coils 132 or 134 to a maximum and decrease the inductance of the other coil to a minimum. Upon the closing of the "sensing" switch 182, if the coils 132 and 134 have been rotated relative to the vane 120 so as to increase the inductance of the coil 132, a substantial decrease in signal intensity will occur because the increased inductance of coil 132 tends to offset the decreased resistance of the shorted arm of the bridge. If this decrease in signal intensity occurs, the student will appreciate that the original bearing which he had was the true bearing. If, on the other hand, the coils 132 and 134 have been rotated so that the vane 120 increases the inductance of coil 134 and decreases the inductance of coil 132, upon the closing of the "sense" switch 182 a substantial increase in signal intensity will occur. This is because the increasing of the inductance of coil 134 and the decreasing of the inductance of coil 132 further upsets the unbalance of the Wheatstone bridge caused by the closing of switch 182. The increase in signal intensity resulting from a closing of the "sensing" switch 182 will indicate to the student that the original bearing which he had was the reciprocal of the true bearing.

It should be noted that in order to achieve the proper effect by a closing of the simulated "sensing" switch 182, the vane 120 must be initially properly positioned relative to the coils 132 and 134 so that upon a placing of the switch 176 in the "R" position, the coils 132 and 134 will rotate so that the inductance of the coil 132 is increased if the "null" position was the true bearing position and so that the inductance of coil 134 will be increased if the "null" position was the reciprocal position.

In view of the foregoing disclosure it will be appreciated that this invention, in accordance with the stated objects thereof, discloses highly useful and novel means for simulating in a grounded navigation training system the operation of radio direction finders carried by planes in actual flight. It will be appreciated that numerous changes may be made in the disclosed preferred embodiment of my invention without departing from the spirit thereof. Also many parts of my invention may be used to great advantage in conjunction with other types of grounded training apparatus than the herein disclosed type of aviation trainer.

I claim:

1. In a grounded navigation training system of the type comprising a fuselage for a student and rudder pedals in the fuselage simulating the rudder pedals of a real plane for changing the assumed heading of the fuselage, a system for simulating a real radio direction indicating system, said system comprising a bridge circuit, a signal source connected to said bridge circuit and signal emitting means connected to said bridge circuit to emit signals of an intensity dependent upon the balance of said bridge circuit, a member located adjacent a portion of said bridge circuit for affecting the balance of said bridge circuit by relative movement between said member and the adjacent portion of said bridge circuit, a first means for producing relative movement between said member and the adjacent portion of said bridge circuit in response to movements of the rudder pedals in the trainer, a second means for producing relative movement between said member and the adjacent portion of said bridge circuit, and switching means in said fuselage simulating the "sense" switching means of actual aircraft connected to said bridge circuit for shorting a portion of the same for affecting the balance of the same.

2. In a grounded navigation training system of the type comprising a fuselage for a student and rudder pedals in the fuselage simulating the rudder pedals of a real plane for changing the assumed heading of the fuselage, a system for simulating a real radio direction indicating system, said system comprising a bridge circuit, a signal source connected to said bridge circuit and signal emitting means connected to said bridge circuit to emit signals of an intensity dependent upon the balance of said bridge circuit, a member located adjacent a portion of said bridge circuit for affecting the balance of said bridge circuit by relative movement between said member and the adjacent portion of said bridge circuit, a first means for producing relative movement between said member and the adjacent portion of said bridge circuit in response to movements of the rudder pedals in the trainer, a second means including a control in the fuselage simulating the loop drive means control in actual aircraft for producing relative movement between said member and the adjacent portion of said bridge circuit, and switching means within the fuselage simulating the "sense" switching means of actual aircraft connected to said bridge circuit for affecting the balance of the same.

3. In a grounded navigation training system of the type comprising a fuselage for a student and rudder pedals in the fuselage simulating the rudder pedals of a real plane for changing the assumed heading of the fuselage, a system for simulating a real radio direction indicating system, said system comprising a bridge circuit, a signal source connected to said bridge circuit and signal emitting means connected to said bridge circuit to emit signals of an intensity dependent upon the balance of said bridge circuit, a member located adjacent a portion of said bridge circuit for affecting the balance of said bridge circuit by relative movement between said member and the adjacent portion of said bridge circuit, a first means for producing relative movement between said member and the adjacent portion of said bridge circuit in response to movements of the rudder pedals in the trainer, a second means for producing relative movement between said member and the adjacent portion of said bridge circuit, a third means including a control in the fuselage simulating the loop drive control in actual aircraft for producing relative movement between said member and the adjacent portion of said bridge circuit, and switching means within the fuselage simulating the "sense" switching means of actual aircraft connected to said bridge circuit for affecting the balance of the same.

GEORGE ALTON DECKER.

REFERENCES CITED

The following references are of record in the file of this patent:

UNITED STATES PATENTS

| Number | Name | Date |
|---|---|---|
| 2,110,869 | Crane | Mar. 15, 1938 |
| 2,119,083 | Link | May 31, 1938 |
| 2,164,412 | Koster | July 4, 1939 |
| 2,179,663 | Link | Nov. 14, 1939 |
| 2,226,726 | Kramer | Dec. 31, 1940 |
| 2,312,962 | De Florez | Mar. 2, 1943 |
| 2,321,799 | Cone | June 15, 1943 |
| 2,326,764 | Crane | Aug. 17, 1943 |
| 2,346,693 | Lyman | Apr. 18, 1944 |
| 2,358,793 | Crane | Sept. 26, 1944 |
| 2,366,603 | Dehmel | Jan. 2, 1945 |
| 2,389,359 | Grow | Nov. 20, 1945 |
| 2,450,240 | Kail | Sept. 28, 1948 |
| 2,485,331 | Stuhrman | Oct. 18, 1949 |